United States Patent [19]
Jordan et al.

[11] Patent Number: 5,656,173
[45] Date of Patent: Aug. 12, 1997

[54] METHOD OF REMOVING DISPERSED OIL FROM AN OIL IN WATER EMULSION EMPLOYING AERATED SOLUTIONS WITHIN A COALESCING MEDIA

[75] Inventors: James Michael Jordan, Tulsa, Okla.; Thomas James Denton, Houston, Tex.

[73] Assignee: National Tank Company, Houston, Tex.

[21] Appl. No.: 611,413

[22] Filed: Mar. 5, 1996

[51] Int. Cl.$^6$ .................. C02F 1/24; C02F 1/28; B01D 17/28; B01D 17/35

[52] U.S. Cl. .............. 210/703; 210/708; 210/712; 210/802; 210/804; 210/221.2; 210/521; 210/DIG. 5

[58] Field of Search ............. 210/703, 708, 210/802, 804, 221.2, 259, 521, 522, DIG. 5, 712

[56] References Cited

U.S. PATENT DOCUMENTS

| | | |
|---|---|---|
| 3,182,799 | 5/1965 | Krofta . |
| 3,754,656 | 8/1973 | Horiguchi . |
| 4,113,629 | 9/1978 | Pielkenrood . |
| 4,231,867 | 11/1980 | Sutphin . |
| 4,246,112 | 1/1981 | Mausgrover ............ 210/104 |
| 4,253,965 | 3/1981 | Dielkenrood . |
| 4,377,485 | 3/1983 | Krofta . |
| 4,782,789 | 11/1988 | Canzoneri ............. 210/703 |
| 4,800,025 | 1/1989 | Bibaeff ................. 210/703 |
| 4,802,978 | 2/1989 | Schmit et al. .......... 210/104 |
| 5,080,802 | 1/1992 | Cairo, Jr. et al. ....... 210/703 |
| 5,156,745 | 10/1992 | Cairo . |
| 5,300,222 | 4/1994 | Braussard . |
| 5,320,750 | 6/1994 | Krofta . |
| 5,516,434 | 5/1996 | Cairo . |

FOREIGN PATENT DOCUMENTS 1397411  5/1988  U.S.S.R. .

OTHER PUBLICATIONS

Byeseda J., Hunter, D. (1979), "Development of a Rectangular Configuration Dissolved Gas Flotation System" NATO Internal Research Report #79018.

Calkin, B., Ball, B. (1984), "Improving Heater Treater Dehydration Efficiency with Performax." Proceedings from the Southwestern Petroleum Short Course. 407–413.

Casady, A.L. (1993), "Advances in Flotation Unit Design for Produced Water Treatment." Production Operations Symposium–Oklahoma City, Mar. 21–23, 581–590.

Carriere, G.R., (1990) "Using Coalescence to Improve Efficiency of Oil/Water Separation: Field Experience, the S.P. Pack Free Flow Coalescer." Advances in Filtration and Separation Technology, 1, 266–281.

Gregmont, G. (1950) Water Treatment Handbook, Baily Brothers Publishers, London, England, 315–327.

Hunter, D. (1984), "Laboratory Evaluation of Various Performax Coalescing Packs." NATCO Internal Research Report #84014.

Hunter, D. Byeseda J. (1979), "Field Evaluation of C–E Natco's Rectangular Configuration Dissolved Air Flotation Pilot at Sun Oil Company's Tulsa Refinery." NATCO Internal Research Report #79019.

(List continued on next page.)

Primary Examiner—Thomas M. Lithgow
Attorney, Agent, or Firm—Head, Johnson & Kachigian

[57] ABSTRACT

A method of removing dispersed oil from an oil in water emulsion is accomplished by the steps of dissolving gas in water to form an aerated solution, introducing the emulsion and aerated solution into a treatment vessel in which is positioned a coalescing media formed by an assembly of closely spaced corrugated plates of oleophilic material, the emulsion and aerated solution passing in contact with the plates to cause oil droplets to coalescence on the plates and small gas bubbles carried with the aerated solution to adhere to the oil droplets to increase the buoyancy of the oil droplets so that the oil droplets more readily rise to the surface of the emulsion, accumulated oil being removed from the surface.

19 Claims, 8 Drawing Sheets

OTHER PUBLICATIONS

Leech, C.A., Radhakrishnan, S., Hillyer, M.J., Degner, D.R. (1980), "Performance Evaluation of Induced Gas Flotation Machine Through Mathematical Modeling."Journal of Petroleum Technology, Jan, 48–58.

Montgomery, J.M. (1985), Water Treatment Principles and Design, Wiley Interscience Publication, NY. 149–151, 533, 534, 649, 650.

Okada K., Akagi, Y., Kogure, M., Yoshioka, N. (1990), "Effect on Surface Charges of Bubbles and fine Particles on Air Flotation Process." The Canadian Journal of Chemical Engineering, 68, 393–398.

Okada, K., Akagi, Y., Yoshioka, N. (1988), "Effect of Zeta Potentials of Oil Droplets and Bubbles on Flotation of Oil–In–Water Mixtures." The Canadian Journal of Chemical Engineering, 66, 276–281.

Rehm, S.J. Shaughnessy, R.J. (1983), "Enhanced Oil–Water Separation—The Performax Coalescer." Society of Petroleum Engineers of AME—Proceedings from the Production Operations symposium. 165–171.

Pal, R., Masliyah, J. (1990), "Oil Recovery from Oil in Water Emulsions Using a Flotation Column." The Canadian Journal of Chemical Engineering, 68, 959–967.

Sato, Y., Murakami, Y., Hirose, T., Urya, Y., Hirata, K. (1980), "Removal of Emulsified Oil Particles by Dispersed Air Flotation." Journal of Chemical Engineering of Japan, 13, 385–389.

Sato, Y., Murakami, Y., Hirose, T., Urya, Y., Hirata, K. (1979), "Removal of Emulsified Oil Particles by Dissolved Air Flotation." Journal of Chemical Engineering of Japan, 12, 454–459.

Shaughnessy, R.J. (1982), "Evaluation of the Performax Matrix Plate Coalescer for Marathon Oil Company, Cody, Wyoming." NATCO Internal Research Report #82011.

Strickland W.T. (1980), "Laboratory Results of Cleaning Produced Water by Gas Flotation." Society of Petroleum Engineers Journal, Jun., 175–190.

Sylvester, N.D., Byeseda, J.J. (1980) "Oil/Water Separation by Induced—Air Flotation." Society of Petroleum Engineers Journal, Dec. 579–590.

Van Ham, N.J.M., Behie, L.A., Svrcek, W.Y. (1983), "The Effect of Air Distribution on the Induced Air Flotation of Fine Oil In Water Emulsions." The Canadian Journal of Chemical Engineering, 61, 541–547.

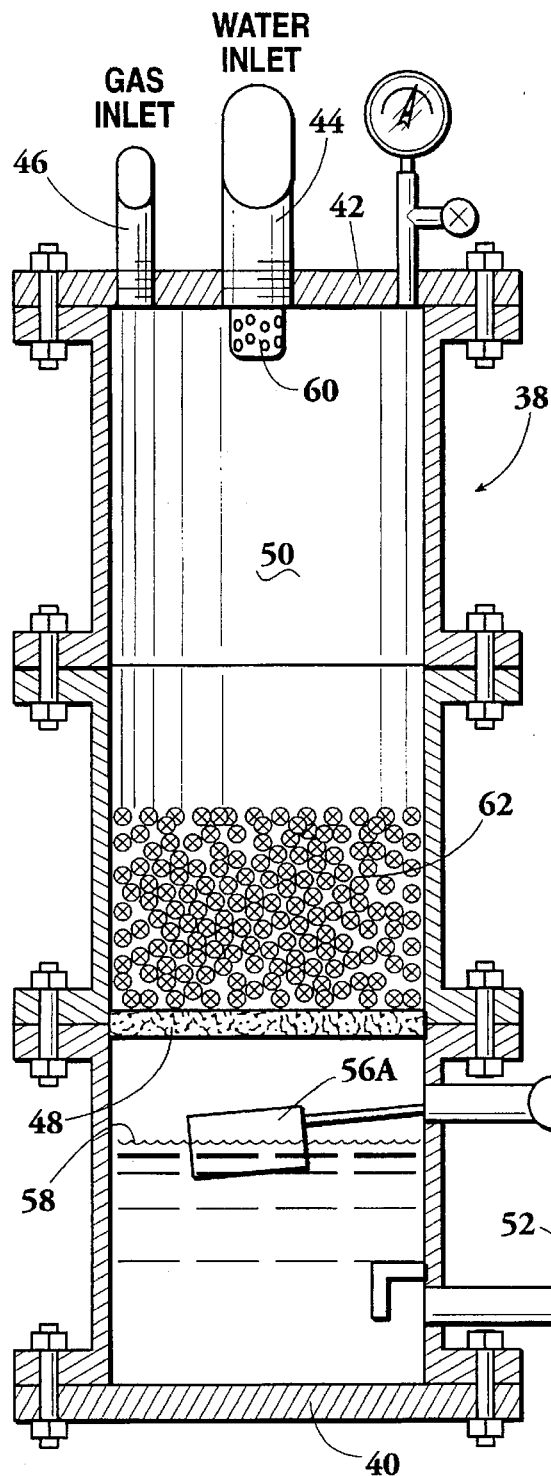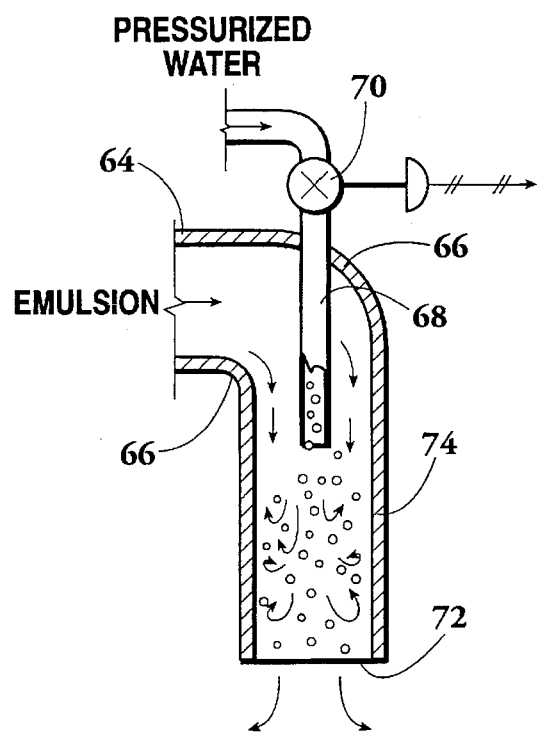
Fig. 4
Fig. 5

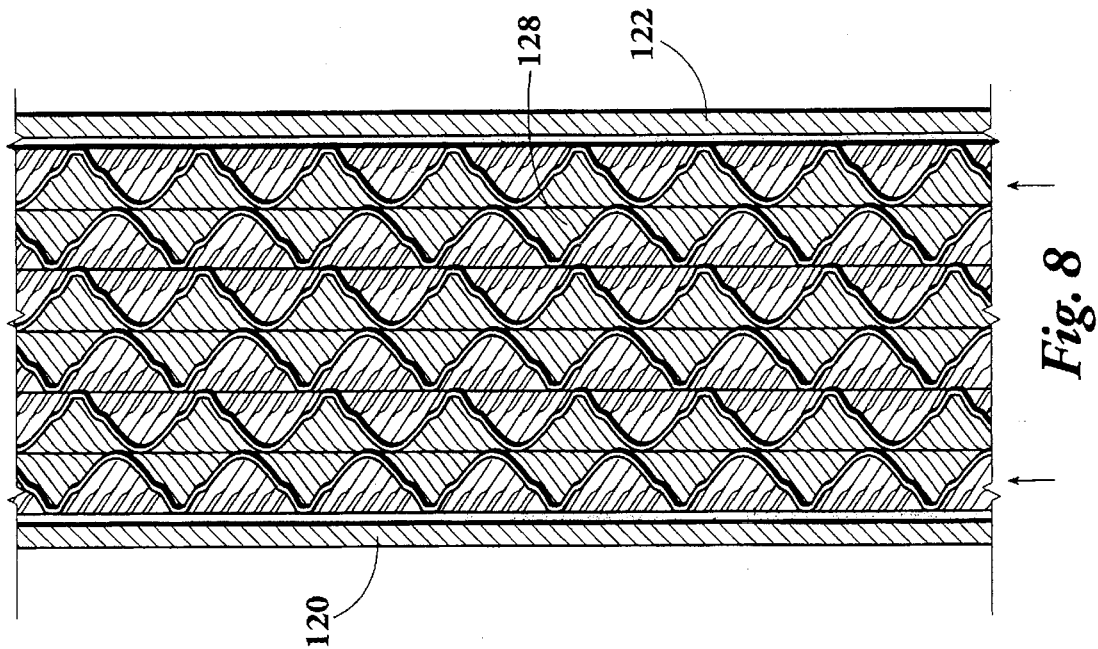
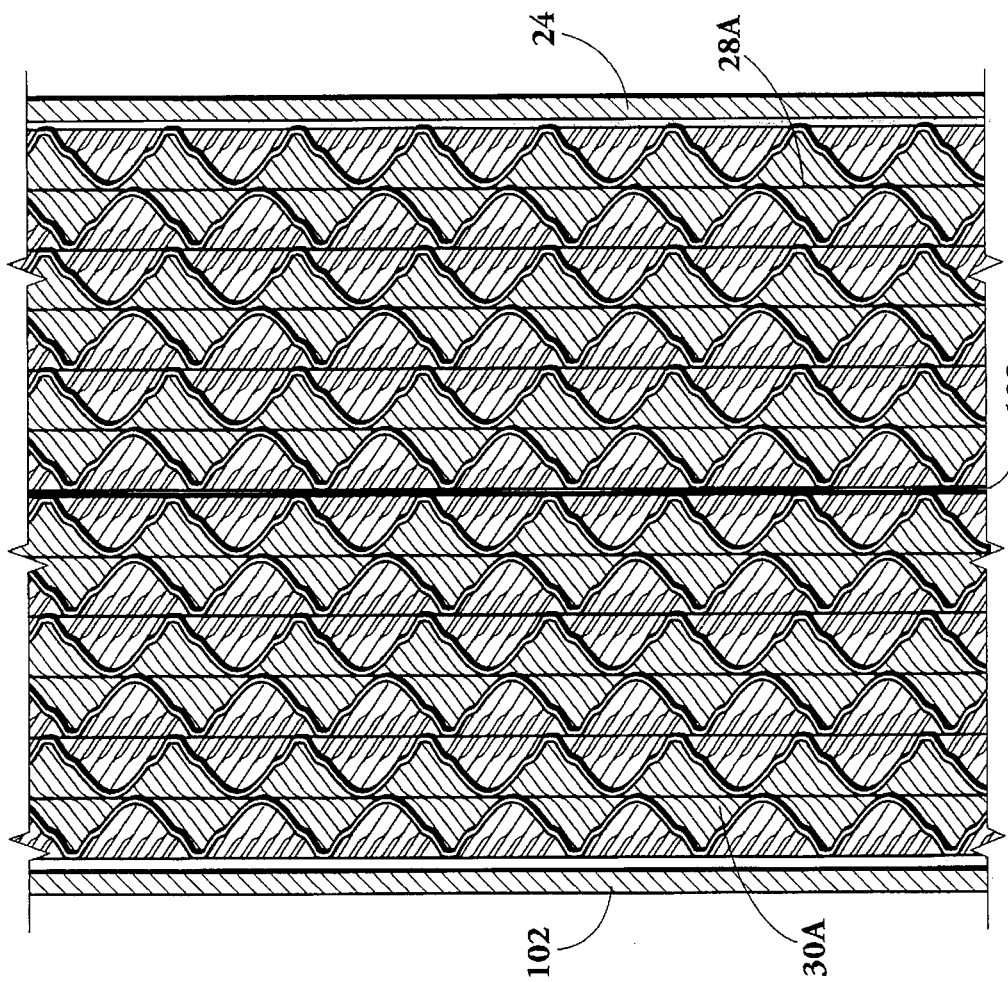

METHOD OF REMOVING DISPERSED OIL FROM AN OIL IN WATER EMULSION EMPLOYING AERATED SOLUTIONS WITHIN A COALESCING MEDIA

REFERENCE TO PENDING APPLICATIONS

This application is not related to any pending applications.

REFERENCE TO MICROFICHE APPENDIX

This application is not referenced in any microfiche appendix.

BACKGROUND OF THE INVENTION

This invention relates to a method and system for removing dispersed oil from an oil in water emulsion.

Many devices, systems, and methods have been developed over the years to remove oil, or the like, from water. Many of these devices typically incorporate a plurality of plates arranged parallel to each other so that the contaminated water may pass between the plates. Such passage causes oil droplets within the water to coalesce into larger droplets. When droplets achieve a minimal size, depending on the temperature, turbidity, and other factors, the oil droplets achieve sufficient buoyancy to permit them to rise to the surface of the water to an oil/water interface. The droplets pass through the interface into the oil phase and the oil, after accumulating, can be removed from one outlet, and water, from which at least a substantial portion of the oil has been removed, is removed from another outlet, that is, the extracted oil and the water are separately withdrawn from the treatment vessel.

Providing corrugated surfaces on the paralleled plates facilitate the coalesce of oil droplets. The plates of separator systems of this type are preferably formed of oleophilic material to augment coalescence of the oil droplets.

Removal of dispersed oil from production water is an issue that has been addressed by a wide variety of products over the years. Parameters affecting the oil droplet rise velocity found in Stokes Law are principles on which conventional oil in water separators have been designed. Produced water cleanup via dissolved gas flotation relies on decreasing the density of the oil droplets by attachment to small gas bubbles (~40 microns). The reduced density pair then rises to the oil/water interface at an accelerated rate; reducing the residence time required to meet a specified outlet oil concentration.

In recent years, more stringent requirements have been adopted by various industries and government agencies regarding the release of oil-contaminated water to the environment. For this reason, methods and systems which have in the past functioned satisfactorily to remove oil to a selected specification of water purity no longer will attain currently imposed stringent purity requirements. Therefore, a need exists for a system for separating oil from an oil/water mixture or oil/water emulsion that can attain a level of water purity heretofore not easily and economically achievable, particularly when relatively large flow rates are encountered.

For background information relating to oil/water separator systems, apparatuses, and methods, reference may be had to the following previously issued United States Patents and printed publications:

| U.S. PAT. NO. | INVENTOR | TITLE |
| --- | --- | --- |
| 4,782,789 | Canzoneri | Induced Static Flotation Cell |
| 4,246,112 | Mausgrover | Oil-Water Separator Having Means For Conditioning The Water For Reuse |
| 4,800,025 | Bibaeff | Apparatus And Process For The Gas Flotation Purification Of Oil-Contaminated Water |
| 5,080,802 | Cairo, Jr. et al. | Induced Gas Liquid Coalescer And Flotation Separator |
| 4,802,978 | Schmit et al. | Oil-Water Separator |

OTHER REFERENCES

1. Byeseda J., Hunter, D. (1979), "Development of a Rectangular Configuration Dissolved Gas Flotation System" NATO Internal Research Report #79018
2. Calkin, B., Ball, B. (1984), "Improving Heater Treater Dehydration Efficiency With Performax." Proceedings from the Southwestern Petroleum Short Course. 407–413.
3. Casady, A. L. (1993), "Advances in Flotation Unit Design for Produced Water Treatment." Production Operations Symposium—Oklahoma City, March 21–23, 581–590.
4. Carriere, G. R., (1993) "Using Coalescence to Improve Efficiency of Oil\Water Separation: Field Experience, the S.P. Pack Free Flow Coalescer." Advances in Filtration and Separation Technology, 1, 266–281.
5. Gregmont, G. (1950) Water Treatment Handbook, Baily Brothers Publishers, London, England. 315–327.
6. Hunter, D. (1984), "Laboratory Evaluation of Various Performax Coalescing Packs." NATCO Internal Research Report#84014.
7. Hunter, D. Byeseda J. (1979), "Field Evaluation of C-E Natco's Rectangular Configuration Dissolved Air Flotation Pilot at Sun Oil Company's Tulsa Refinery." NATCO Internal Research Report #79019.
8. Leech, C. A., Radhakrishnan, S., Hillyer, M. J., Degner, D. R. (1980), "Performance Evaluation of Induced Gas Flotation Machine Through Mathematical Modeling." Journal of Petroleum Technology, Jan, 48–58.
9. Montgomery, J. M. (1985), Water Treatment Principles and Design, Wiley Interscience Publication, N.Y. 149–151, 533, 534, 649, 650.
10. Okada K., Akagi, Y., Kogure, M., Yoskioka, N. (1990), "Effect on Surface Charges of Bubbles and fine Particles on Air Flotation Process." The Canadian Journal of Chemical Engineering, 68, 393–398.
11. Okada, K., Akagi, Y., Yoskioka, N. (1988), "Effect of Zeta Potentials of Oil Droplets and Bubbles on Flotation of Oil-In-Water Mixtures." The Canadian Journal of Chemical Engineering, 66, 276–281.
12. Rehm, S. J. Shaughnessy, R. J. (1983), "Enhanced Oil-Water Separation—The Performax Coalescer." Society of Petroleum Engineers of AME—Proceedings from the Production Operations symposium. 165–171.
13. Pal, R., Masliyah, J. (1990), "Oil Recovery from Oil in Water Emulsions Using a Flotation Column." The Canadian Journal of Chemical Engineering, 68, 959–967.
14. Sato, Y., Murakami, Y., Hirose, T., Urya, Y., Hirata, K. (1980), "Removal of Emulsified Oil Particles by Dispersed Air Flotation." Journal of Chemical Engineering of Japan, 13, 385–389.
15. Sato, Y., Murakami, Y., Hirose, T., Urya, Y., Hirata, K. (1979), "Removal of Emulsified Oil Particles by Dissolved Air Flotation." Journal of Chemical Engineering of Japan, 12, 454–459.

16. Shaughnessy, R. J. (1982), "Evaluation of the Performax Matrix Plate Coalescer for Marathon Oil Company, Cody, Wyo." NATCO Internal Research Report #82011.
17. Strickland W. T. (1980)), "Laboratory Results of Cleaning Produced Water by Gas Flotation." Society of Petroleum Engineers Journal, June, 175–190.
18. Sylvester, N. D., Byeseda, J. J. (1980) "Oil/Water Separation by Induced—Air Flotation." Society of Petroleum Engineers Journal, December 579–590.
19. Van Ham, N. J. M., Behie, L. A., Svrcek, W. Y. (1983), "The Effect of Air Distribution on the Induced Air Flotation of Fine Oil In Water Emulsions." The Canadian Journal of Chemical Engineering, 61, 541–547.

BRIEF SUMMARY OF THE INVENTION

A method of removing dispersed oil from an oil in water emulsion includes the steps of dissolving gas in water to form an aerated solution. The oil in water emulsion is introduced into a treatment vessel in which is positioned an assembly of closely spaced matrix plates formed of oleophilic material, such as corrugated plates formed of PVC or poly-propylene plastic. The emulsion is caused to pass in contact with the plates. Simultaneously with passing the emulsion between the assembly of closely spaced oleophilic plates, the aerated solution is introduced into the treatment vessel to intermingle with the emulsion. As the emulsion passes through the plates, oil droplets coalesce on the plates into larger oil droplets. The aerated solution releases gas bubbles in the emulsion being treated, the bubbles attaching themselves to oil droplets. When an oil droplet and a bubble or bubbles attach, the buoyancy of the oil droplet is greatly enhanced so that the oil droplets more readily rise by flotation to the water surface where an oil/water interface is formed.

A liquid level is maintained within the vessel, the oil droplets rising to the surface of the liquid level. The oil droplets accumulate on the liquid surface to form an oil phase. The method includes the step of extracting oil that accumulates in the oil phase on the oil liquid interface. Water, having substantially all of the entrained oil extracted from it, is separately removed from the vessel.

In a preferred arrangement of practicing the invention, the aerated solution is introduced into the treatment vessel in a manner to create turbulence in the emulsion, the turbulence causing oil droplets to impinge against the matrix plates to promote oil droplet coalescence, and turbulence further augments the attachment of gas bubbles to oil droplets to increase separation effectiveness.

A system for removing dispersed oil from water in an oil emulsion that may be effectively employed for practicing the method of this invention includes (a) an aeration apparatus for dissolving a gas in water to provide an aerated solution; (b) a process vessel having an emulsion inlet, an aerated solution inlet in communication with the aeration apparatus, an oil outlet, and a water outlet; (c) a matrix of closely spaced oleophilic plates positioned within the process vessel and arranged to receive a commingled flow of emulsion and aerated solution introduced through the emulsion inlet, the oleophilic plates serving to enhance the coalescence of oil droplets from the emulsion and the gas bubbles being released from the aerated solution tending to adhere to the oil droplets to enhance the buoyancy thereof; (d) an interface level detector for maintaining a liquid level surface within the process vessel, the oil droplets migrating to the liquid level surface to form an oil phase on top of the water surface within the vessel; (e) a flow path provided in the vessel for removing oil that accumulates in the oil phase on top of the oil/water level interface; and (f) the water outlet being positioned below the water level surface so that water, after having passed through the matrix of closely spaced oleophilic plates, is removed from the vessels.

In the system a distribution compartment may be positioned within a lower portion of the process vessel in communication with the emulsion inlet where the emulsion and aerated solution are combined prior to contact with the oleophilic plate matrix.

A better understanding of the invention will be obtained from the following description of the preferred embodiments, taken in conjunction with the attached drawings.

DESCRIPTION OF THE DRAWINGS

In FIG. 1 the emulsion fluid flow is through a horizontally arranged matrix of closely spaced oleophilic plates through which the emulsion passes vertically and a second matrix of closely spaced oleophilic plates through which the emulsion passes generally horizontally.

FIG. 2 employs a horizontal cylindrical tank having an emulsion inlet intermediate the opposed ends of the tank with a water outlet adjacent each end of the tank. The apparatus of FIG. 2 employs the method wherein an emulsion and an aerated solution are introduced into the interior of the vessel approximately midway between the opposed ends. The emulsion flows upwardly through vertically arranged closely spaced oleophilic plates, the emulsion flowing out of the oleophilic plates in directions towards both of the opposed ends of the vessel. Between the centrally positioned matrix of plates there is, in the direction towards the first end of the vessel, a vertical assembly of plates through which the emulsion passes generally horizontally and, in like manner, towards the other end of the vessel is a similar vertical matrix of oleophilic plates through which the emulsion passes essentially horizontally.

FIG. 4 is an elevational cross-sectional, more or less, diagrammatic view of an aerator that can be used for producing aerated solution employed in the method of the invention.

FIG. 5 is a diagrammatic representation of a preferred means of introducing a pressurized water stream into the emulsion.

FIG. 7 shows similar oleophilic plates formed together in a matrix as they appear in cross-section and along the line 7—7 of FIG. 2.

FIG. 8 is a similar cross-sectional arrangement of an oleophilic plate assembly as seen along the line 8—8 of FIG. 3.

DETAILED DESCRIPTION OF THE PREFERRED EMBODIMENTS

Figure 1:
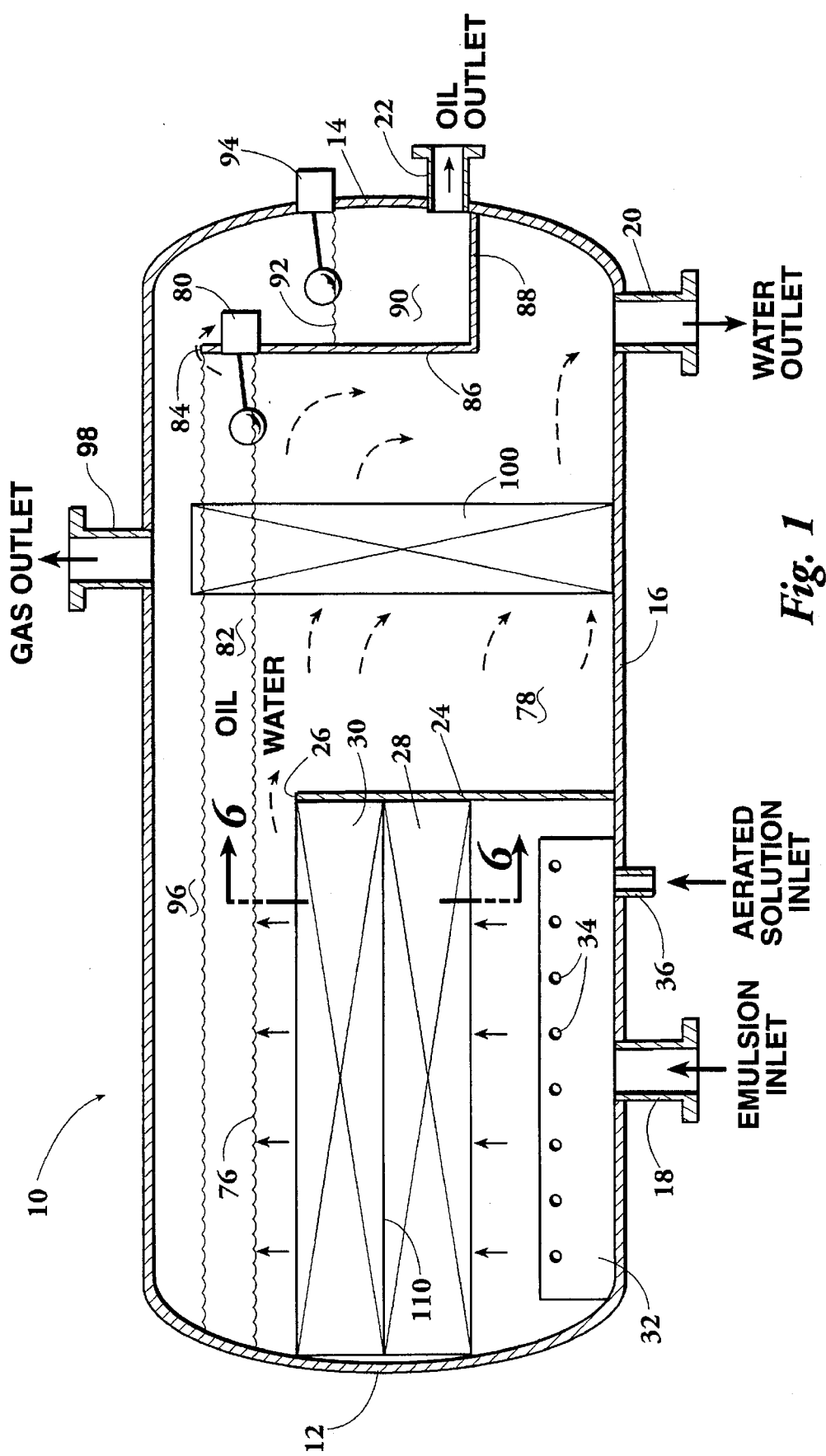
FIG. 1 is an elevational cross-sectional view of a horizontal cylindrical vessel showing one system for practicing the method of this invention. In the embodiment of FIG. 1, an emulsion inlet is provided adjacent one end of the vessel with a water outlet and an oil outlet adjacent the, opposite end of the vessel and with an aerated solution inlet positioned intermediate the emulsion inlet and the water outlet.

Referring first to FIG. 1, an embodiment of the apparatus that may be employed in a system to practice the method of this invention is illustrated. The apparatus being in the form of a horizontal vessel 10 having a first end wall 12 and a second end wall 14. Formed in the bottom 16 of vessel 10 adjacent first end wall 12 is an emulsion inlet 18. Formed in bottom 16 adjacent second end wall 14 is a water outlet 20. An oil outlet 22 is formed in second end wall 14.

Positioned internally of vessel 10 and intermediate ends 12 and 14 is a divider plate 24 having an upper edge 26. Positioned between divider plate 24 and vessel first end 12 is a matrix of closely spaced oleophilic plates. In the arrangement illustrated, a first matrix 28 is formed with an upper second matrix 30. Each matrix 28 and 30 is formed of a plurality of corrugated continuous plates formed of an oleophilic material such as PVC or polyethylene plastic. Each matrix is formed of the corrugated plates of the type that are commercially available from the National Tank Company whose home office is in Houston, Tex. and sold under the trademark "PERFORMAX"®. The PERFORMAX plates are typically formed in a matrix in which the grooves in one plate run approximately 90° with respect to the grooves in the contiguous plate. The matrix is preferably organized so that the grooves extend at an angle of 45° with respect to the horizontal. Not only are the PERFORMAX plates provided with corrugations but also with spaced apart indentations to thereby provide surfaces affording increased opportunity for the impingement of oil droplets as the emulsion moves vertically through the plates.

Positioned within the lower interior of vessel 10 between divider plate 24 and end wall 12 is a spreader or diffuser 32 having a plurality of openings 34. The emulsion flowing into the interior of vessel 10 through inlet 18 passes through diffuser 32 to thereby spread the flow of the emulsion upwardly in the vessel through first matrix 28 and second matrix 30 of oleophilic plates.

Formed in bottom 16 of vessel 10 adjacent divider plate 24 is an aerated solution inlet 36. An important aspect of the method and apparatus herein disclosed is a means of enhancing the coalescence of oil droplets of the emulsion flowing through the oleophilic plates 28 and 30 that is achieved by augmenting the buoyancy of coalescenced oil droplets employing gas bubbles. For this purpose an aerated solution is injected through either inlet 36 or emulsion inlet 18 to commingle with the emulsion to pass upwardly through the matrix of oleophilic plates.

FIG. 4 illustrates an apparatus that can be used to provide an aerated solution. In FIG. 4, an aeration column generally indicated by the numeral 38 is illustrated. The illustrated aeration column is a vertically cylindrical vessel having a bottom 40 and top 42. A water inlet 44 and gas inlet 46 are provided in top 42. Intermediate the height of vessel 38 is a perforated packing support 48 that divides the vessel into an upper interior portion 50 and a lower interior portion 52. Positioned within upper portion 50 and resting on the perforated packing support 48 are packing rings, such as commercially available Pal Rings—a type of packing frequently used in process vessels, particularly in the oil and gas industry or in any environment in which commingling of gas in liquid needs to be enhanced.

Formed in the sidewall of vessel 38 adjacent bottom 40 is a water outlet 52 having a valve 54 (or 70) that functions in response to a level detector 56 which, by way of illustration, includes, as a part thereof, a float 56A to thereby maintain an aerated water level 58 within the vessel lower interior portion 52.

Water is introduced into the vessel through inlet 44 and passes through spray nozzle 60. Gas pressure is maintained within vessel 38 by gas injected into the vessel through gas inlet 46. The gas may be air, carbon dioxide, nitrogen, natural gas, methane, etc. As water is sprayed through nozzle 60 into the vessel in which gas pressure is maintained, the gas is dissolved and absorbed by the water. The water passes downwardly through packing 62 and perforated packing support 48 into the vessel lower portion 52. Thus, the water within lower interior portion 52 is aerated and the water is withdrawn from vessel 38 through outlet 52 and conveyed to aerated solution inlet 36 of the treatment vessel of FIG. 1.

FIG. 5 is a diagrammatic illustration of a method of mixing an aerated solution with an emulsion. Emulsion is injected through pipe 64 having a 90° bend 66 therein. A smaller diameter line 68 is positioned within pipe 64 at bend 66. An aerated solution, that is, water containing dissolved gas, is injected through pipe 68 as controlled by valve 70, the gas bubbles form due to the pressure drop created by valve 70, the bubbles being dispersed within the emulsion stream. Outlet 72 thus provides an aerated emulsion stream to pass into inlet 18 in the vessel of FIG. 1. In the preferred arrangement, as shown in FIG. 5, portion 74 of pipe 64 extends just past elbow 66. The apparatus of FIG. 5 serves as an intermediate between aeration tower 38 of FIG. 4 and emulsion inlet 18 of vessel 10. Valve 54 of FIG. 4 and valve 70 of FIG. 5 can be one and the same.

The aerated solution passes upwardly through first matrix 28 and second matrix 30 as it is commingled with the upwardly flowing emulsion stream. The aerated solution has a dramatic effect on the removal of the oil component from the emulsion. As the emulsion flows through the matrix of closely spaced corrugated plates of oleophilic material, small droplets of the entrained oil form. These small droplets will stay in suspension unless and until the buoyancy of the droplets is sufficient to cause the droplets to move upwardly through the water filling the vessel to the oil/water interface 76. Below interface 76 the vessel is filled with water 78, the water level being controlled by an interface detector 80 which, in turn, controls a valve (not shown) that regulates the passage of water out of vessel 10 through water outlet 20. Above oil/water interface 76 is a layer of oil 82. As oil accumulates it passes over the top edge 84 of a vertical plate 86 which together with a lower plate 88 form an oil compartment 90 within the interior of vessel 10. Thus, the top edge 84 functions as a weir. Oil collected in oil compartment 90 is maintained at a level 92 by means of a level detector 94 that controls a valve (not shown) in series with oil outlet 22.

As previously stated, the upward migration of the aerated solution introduced into vessel 10 through inlet 36 significantly augments separation of oil from the emulsion. As small droplets of oil form in matrix 28 and 30, droplets are contacted by the aerated solution which carries small gas bubbles as a part thereof. These gas bubbles tend to attach themselves to the small oil droplets to greatly increase the buoyancy of the oil droplets to cause them to more readily pass upwardly through water 78 within the vessel and pass through the oil/water interface 76.

The aerated solution provides a further improvement in the separation of oil from water within vessel 10 in that the aerated solution helps agitate the emulsion as it flows upwardly through matrix 28 and 30. This agitation is achieved by the effect of the gas bubbles entrained in the aerated solution as they aggressively move upwardly through the fluid within the vessel. The effect of this agitation is to increase the contact of the emulsion with the surfaces of the oleophilic plates to thereby more readily induce coalescence of oil contained in the emulsion.

The entrained gas contained in the aerated solution passes upwardly through water 78, through the oil/water interface 76, and oil 82 into the upper portion 96 of the carrier of vessel 10, the upper portion 96 being above all fluid levels, and the gas ultimately passes out of the vessel through a gas outlet 98. The outlet gas may be recycled, such as back into gas inlet 46 of aeration column 38 as shown in FIG. 4.

Positioned within the interior of vessel 10 between divider plate 24 and end wall 14 is a third matrix 100 of closely spaced paralleled corrugated oleophilic plates. The emulsion, after having passed through matrix 28 and 30 in a vertical upward path and having passed over upper edge 26 of divider plate 24, flows generally horizontal through third matrix 100 where a third opportunity for coalescence takes place. The emulsion having substantially all of the oil components removed after flowing through a third matrix 100 flows out of the vessel through water outlet 20.

Figure 2:
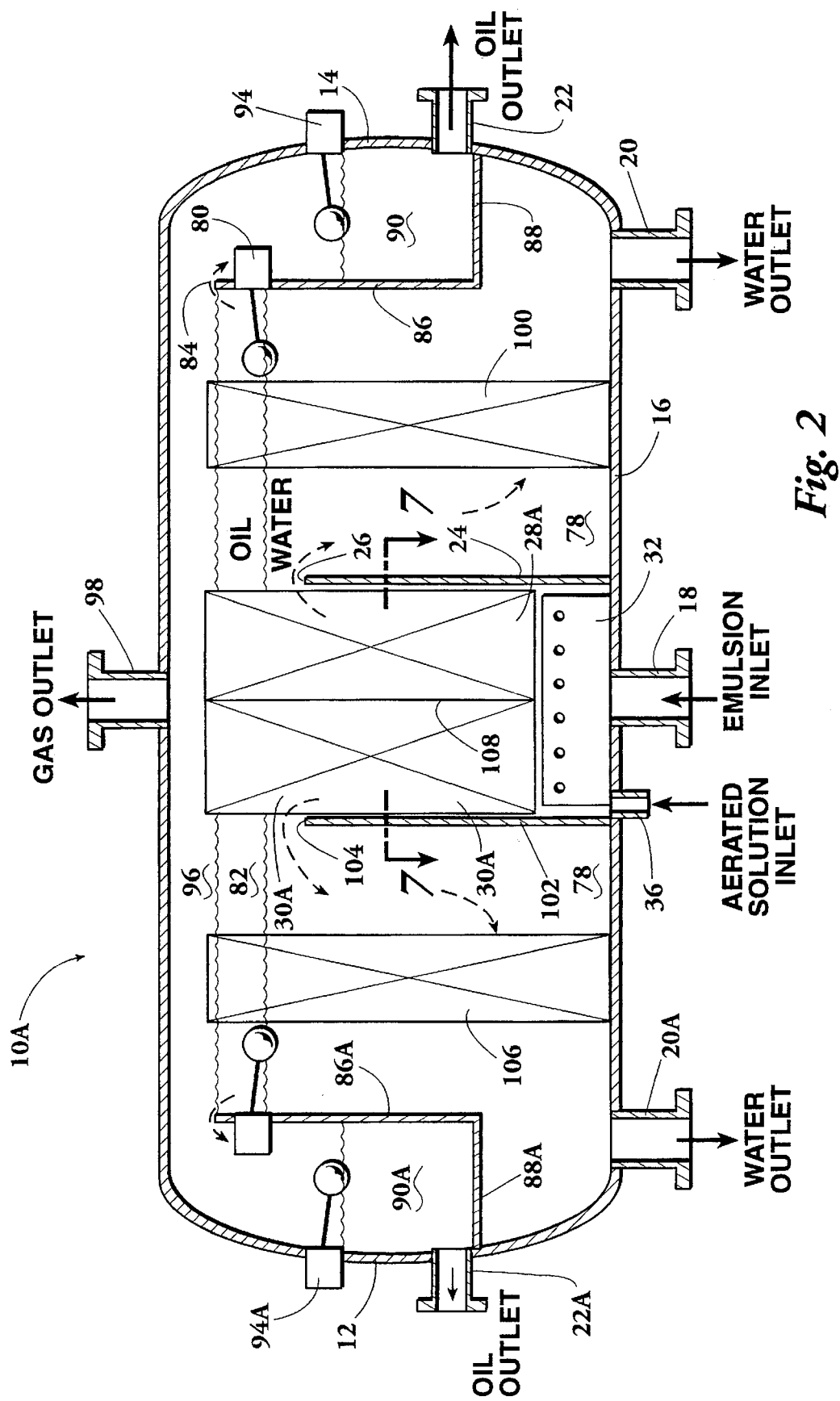
FIG. 2 is a first alternate embodiment of an apparatus for practicing the method of this invention.

Referring now to FIG. 2, an alternate system is illustrated for practicing the method of this invention wherein components similar to those of FIG. 1 are assigned the same element number. A basic difference between the system of FIG. 2 and that of FIG. 1 is that in FIG. 2 the emulsion after having entered emulsion inlet 18 flows generally horizontally in diverse directions toward first end wall 12 and second end wall 14 of vessel 10A. It can be seen that the right hand portion of the vessel of FIG. 2 is substantially the same as the entire vessel of FIG. 1 with this exception, that is, matrix 28 and 30 are each arranged vertically rather than horizontally. Thus, in FIG. 2 first matrix is designated by the numeral 28A and second matrix by the numeral 30A. FIG. 2 adds a second divider plate 102 spaced parallel to the first divider plate 24, the second divider plate 102 providing an upper edge 104 over which the emulsion flows after having passed through matrix 30. A fourth matrix 106 is vertically positioned between second divider plate 102 and vessel end wall 12 through which the emulsion passes prior to exiting from the vessel through a second water outlet 20A. A second vertical plate 86A and lower plate 88A provide for a second oil compartment 90A that communicates with a second oil outlet 22A. The level of oil in the second compartment 90A is controlled by a second level detector 94A.

The advantage of the system of FIG. 2 is that it enables a vessel of the size comparable to the vessel of FIG. 1 to handle a greater volume of emulsion. The principal of operation of the system of FIG. 2 is the same as FIG. 1, that is, the aerated solution passing upwardly through matrix 28 and 30 augments the separation of entrained oil by adding turbulence and buoyancy to oil droplets.

Figure 6:
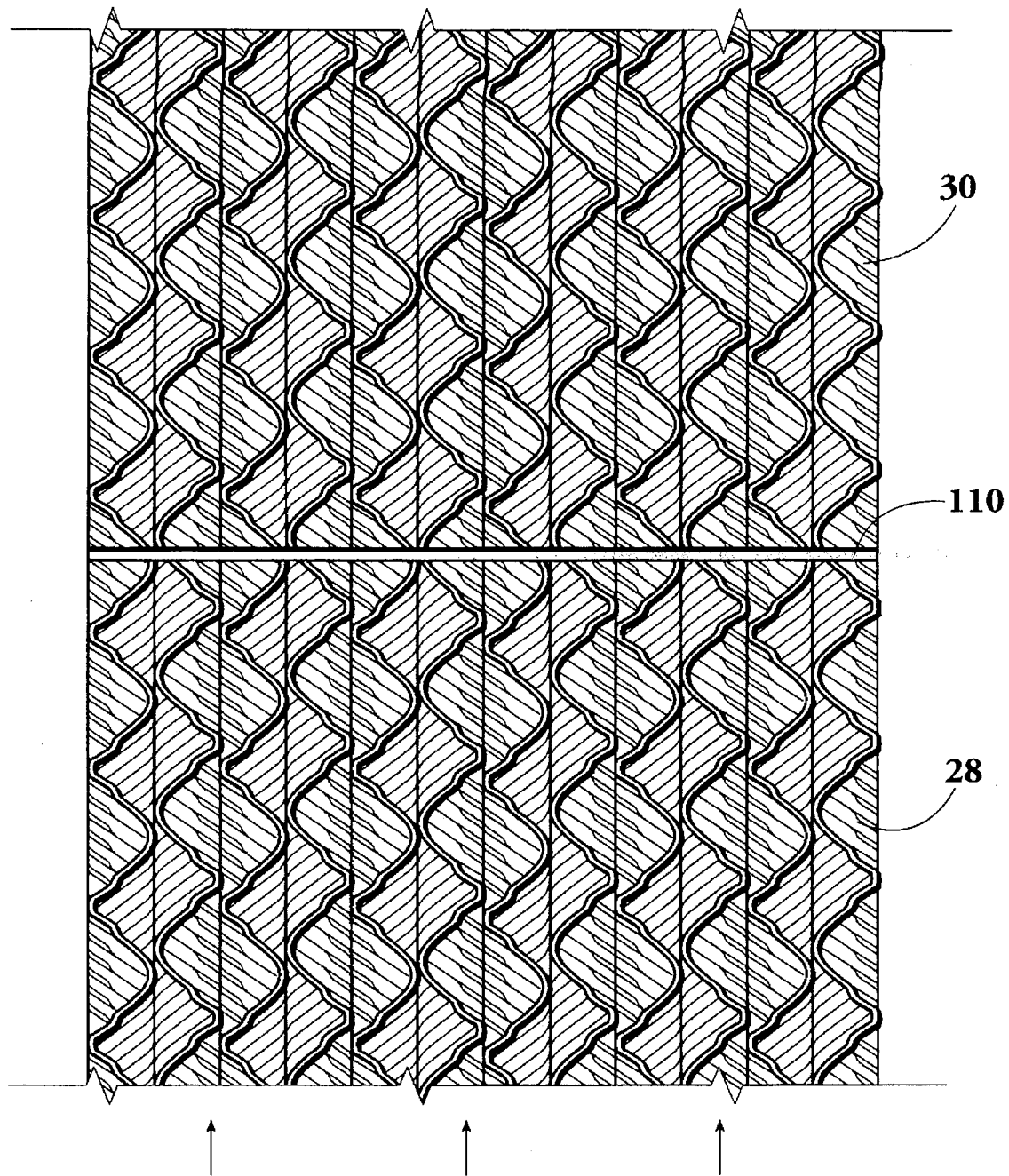
FIG. 6 is an enlarged fragmentary cross-sectional view of a matrix of closely spaced oleophilic plates as taken along the line 6—6 of FIG. 1.

A cross-sectional view of matrix 28A and 30A is shown in FIG. 7. While two matrixes 28A and 30A are employed with a dividing line 108. However, the dividing line 108 does not indicate an impervious surface as the ends of each matrix is open for fluid passage. The function of the system would be the same if matrixes 28A and 30A were one matrix of double thickness. The dividing line 108 is indicative of the fact that in the practicalities of manufacturing, the matrixes, formed of closely spaced parallel plates of corrugated oleophilic material, are preferably formed in sections of selected thickness and the sections can be joined together in manufacturing a coalescing system. In like manner, the dividing line 110, as seen in FIGS. 1 and 6, does not represent an impervious line but, in the contrary, merely a separation of one matrix from another wherein fluid freely flows without restriction.

Figure 3:
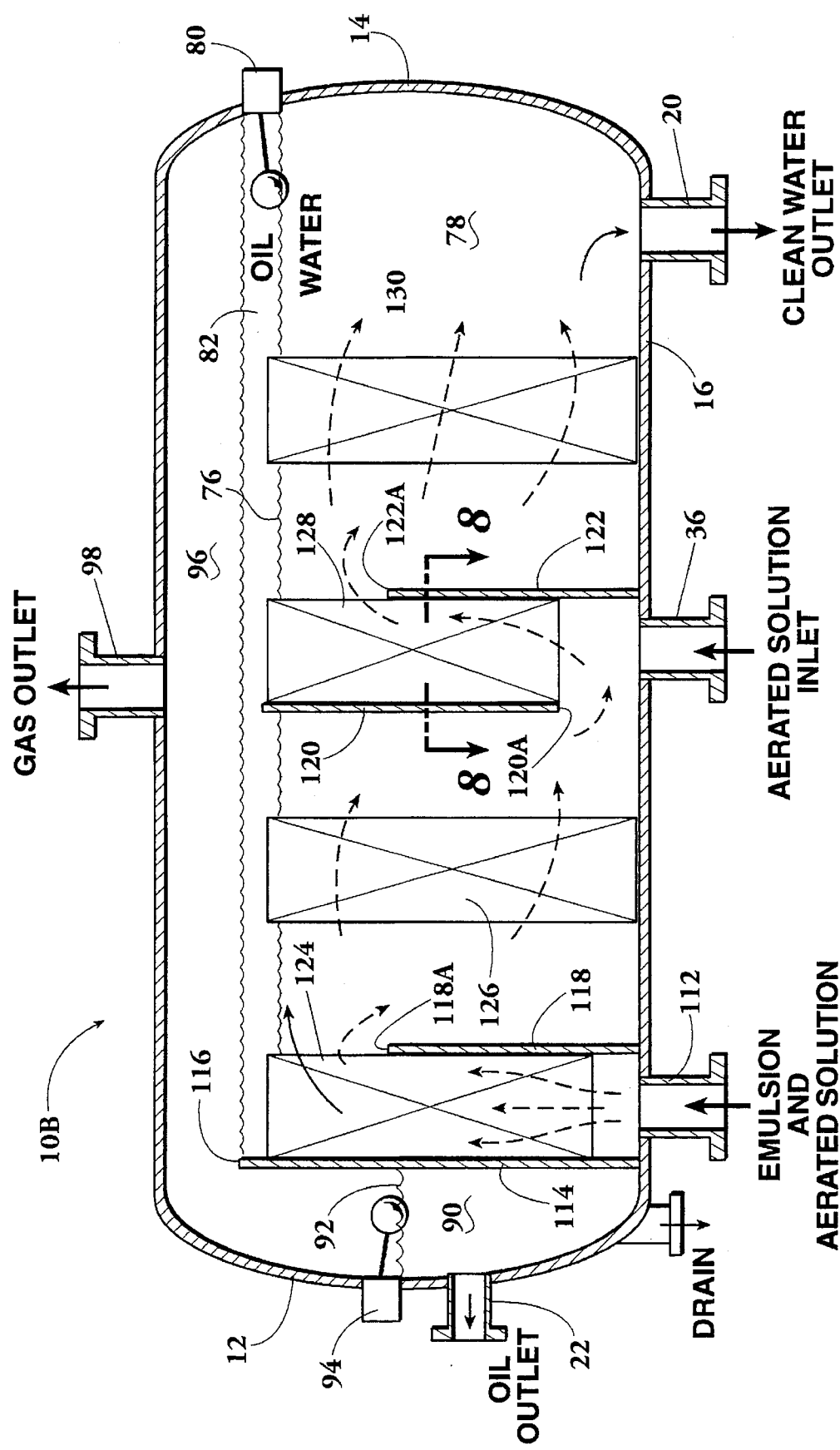
FIG. 3 is a second alternate embodiment of the invention in which aerated solution is commingled with the emulsion prior to introduction into the vessel and in which a separate aerated solution inlet is also employed adjacent the intermediate portion of the vessel between the two opposed ends. An important advantage of the embodiment of FIG. 3 is that the emulsion is caused to flow first vertically through a vertically arranged matrix of oleophilic plates, then horizontally through vertically arranged plates, then again vertically through an assembly of plates and finally horizontally through an assembly of plates. The flow direction changes to help cause the oil droplets to separate from the flowing emulsion and to rise to the oil phase within the vessel, which floatation tendency is dramatically augmented by the introduction of aerated water into the vessel.

FIG. 3 illustrates a third system for practicing the method of this invention utilizing vessel 10B similar to that of FIGS. 1 and 2 but wherein the internal arrangement is different. Emulsion inlet 112 has a different function in the embodiment of FIG. 3 than the emulsion inlets in FIGS. 1 and 2, that is, in the arrangement of FIG. 3 the emulsion is commingled with an aerated solution before introduction into vessel 10B. The commingling of the emulsion and aerated solution can be obtained by joining the flow of the emulsion from outlet pipe 52 of aeration column 38, as shown in FIG. 4, or from outlet end 72 of pipe 74 as shown in FIG. 5. The interior of vessel 10B is divided by four plates, that is, a first plate 114 is positioned adjacent end wall 12, the plate extending from vessel bottom 16. Plate 114 has an upper end 116 that functions as a weir over which oil flows into oil compartment 90 and ultimately out the oil outlet 22.

A second plate 118 extends from the vessel bottom 16 but has an upper edge 118A that is spaced well below oil/water interface 76.

A third plate 120 has a lower end that is above vessel bottom 16 and a top end that extends within but below the surface of oil phase 82. Fluid passing horizontally through the vessel flows underneath the lower end 120A of plate 120.

A fourth plate 122 is like plate 118, that is, it extends from vessel bottom 16 and has a top edge 122A that is substantially below the oil/water interface 76.

In the embodiment of FIG. 3, four matrixes of coalescencing plates are employed, the first matrix 124 being positioned between plates 114 and 118. The emulsion combined with the aerated solution passes upwardly through matrix 124. Oil droplets that coalescence and rise to the oil phase 82 can move directly upwardly through matrix 124. Emulsion commingled with aerated solution passes over the top edge 118A of plate 118, and the emulsion and commingled aerated solution passes generally horizontally through a second matrix 126. As coalescence takes place, oil droplets rise within the matrix and pass into oil phase 82.

After passing through second matrix 126, the emulsion must then flow under the lower edge 120A of plate 120, and the emulsion then flows upwardly through a third matrix 128. Aerated solution is introduced into the interior of vessel 10B through opening 36 that is directly positioned below third matrix 128. Thus, as the emulsion passes upwardly within the third matrix it is commingled with the aerated solution to augment the separation of oil droplets as previously described, the oil droplets passing upwardly through the matrix into oil phase 82.

The emulsion, passing out of third matrix 128, passes over top 122A of plate 122 and flows generally horizontally through a fourth matrix 130 where any remaining oil droplets are coalesced and passed upwardly by buoyancy, augmented by small gas bubbles that adhere thereto into oil phase 82. Water, being substantially free of entrained oil, is then removed from the vessel through water outlet 20. The level of water is maintained by an interface detector 80 in the same way as employed in FIGS. 1 and 2.

An advantage of the arrangement of FIG. 3 is that it provides a flow path by which emulsion twice passes vertically upwardly through vertically arranged corrugated coalescing plates and twice passes generally horizontally through vertically arranged corrugated coalescing plates. Further, the arrangement of FIG. 3 uses an aerated solution in two different ways, that is, first when commingled with the emulsion as it passes initially into the vessel through inlet 112 and second, when the aerated solution is separately introduced through inlet 36. The embodiments illustrated in FIGS. 1,2 and 3 are exemplary of the many different geometrical arrangements that can be achieved to practice the method of the invention.

FIG. 8 is a cross-sectional view of third matrix 128 as positioned between plates 120 and 122.

In tests of the method herein described, an emulsion having an oil concentration of 1500 parts per million (ppm) was successfully treated to reduce the oil content to 20 parts per million. In the tests, a water soluble polymer was added to the solution. It has been shown that the addition of a water soluble polymer substantially increases the effectiveness of the system. The concept of use of a polymer to augment coalescence is known and therefore such usage is not a part of the invention described and illustrated herein, but in practicing the method of this invention the practitioner will normally find that the inclusion of a polymer will improve the effectiveness of the invention. Positioning a matrix vertically in a flow path has been shown to improve results in that flow in a vertical direction through the coalescing media provides a flow pattern that is more tortuous than the conventional design wherein flow is horizontally through vertically arranged parallel corrugated coalescing plates. By increasing the tortuosity combined with the rising gas bubbles created by the introduction of an aerated solution introduces turbulence to the emulsion as it passes through the matrix. While excessive turbulence can be counterproductive, a degree of turbulence that is achieved by using an aerated solution improves performance. Further, it has been learned that, in general, the higher the concentration of dissolved gas in the aerated solution the more effectively the method will reduce oil concentrations in the clean water discharge.

Figure 9:
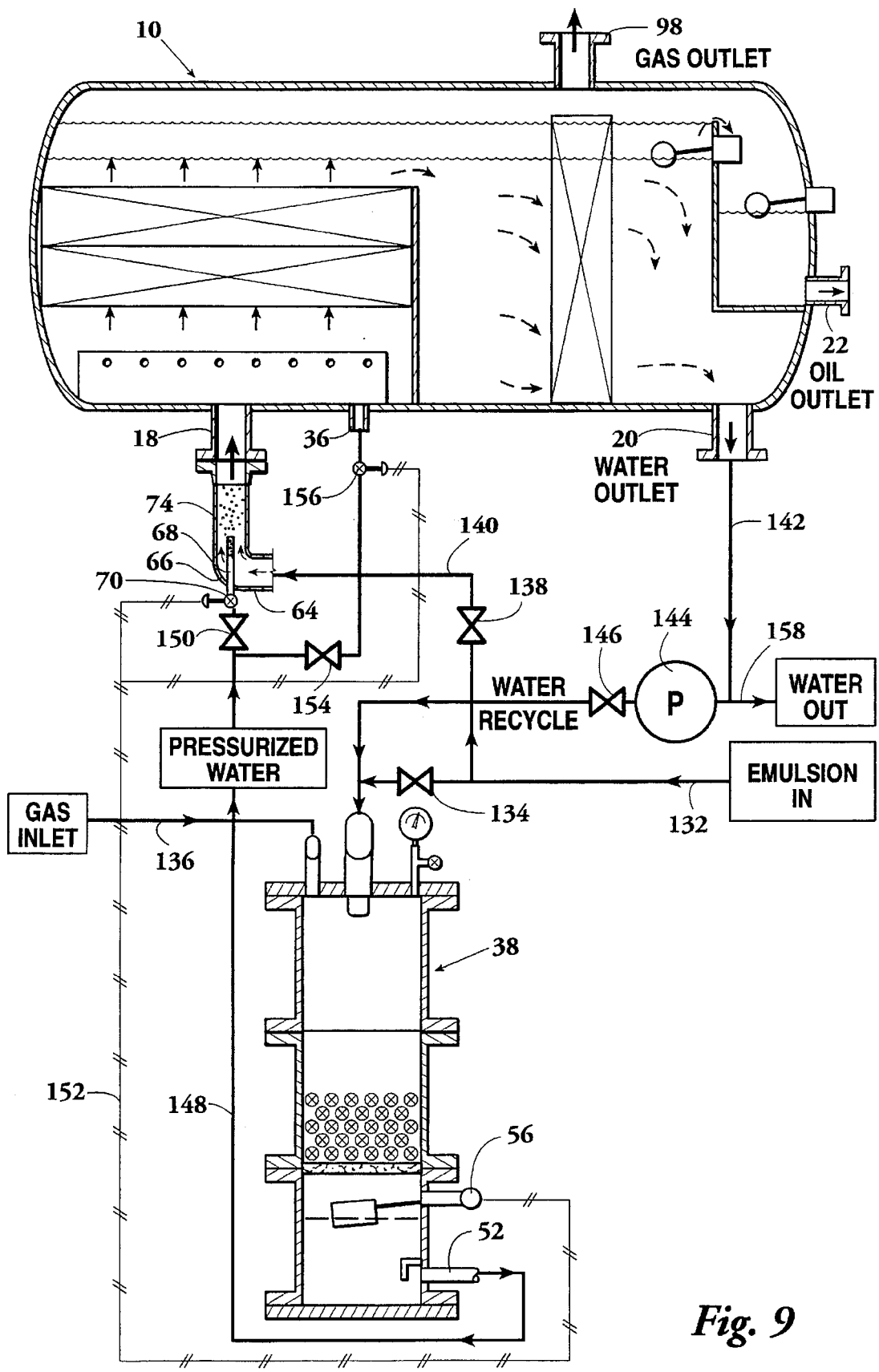
FIG. 9 illustrates the piping arrangement of a system for removing dispersed oil from an oil in water emulsion within a coalescing media employing a process vessel as illustrated in FIG. 1.

FIG. 9 illustrates a complete system for practicing the methods of this invention. The system of FIG. 9 employs the process vessel 10 that has been described in detail with reference to FIG. 1. Emulsion flows into the system through pipe 132 and can take one of two or a combination of routes. If valve 134 is open, the emulsion follows a first route and enters inlet 44 of aeration column 38 and is aerated as previously described with reference to FIG. 4. Gas, such as air, carbon dioxide, natural gas, methane, etc., is supplied by way of pipe 136. An alternate, second route for the flow of emulsion from pipe 132 is through valve 138 (when opened) and then pipe 140 to the inlet 64 of the aeration apparatus of the type described with reference to FIG. 5. The emulsion is aerated within the 90° bend formed by pipe 64, 74 and passes into inlet 18 of process vessel 10.

If valve 134 is closed, recycled water can pass by way of conduit 142 from the process vessel water outlet 20 through a positive displacement pump 144 and valve 146 to water inlet 44 of aeration column 38.

Aerated water from outlet 52 of aeration column 38 flows by way of pipe 148 and valves 150 and 70 into inlet pipe 66 to inject aerated water into the emulsion.

To maintain a level 58 of aerated water in the lower portion of aeration column 38, a control signal is provided by level control 56. The signal passes by way of conductors 152 to control valve 70. Thus, while valves 150 and 70 are in series they have different functions, that is, valve 70 functions to control the level of aerated water within the lower portion of aeration column 38, while valve 150 can be used in coordination with valves 134 and 138 to control the ratio of aerated water and emulsion that is passed into process vessel 10 through emulsion inlet 18.

In addition to the arrangement just described of introducing aerated water into the emulsion before the emulsion is passed into process vessel 10, an alternative arrangement includes injecting all or a portion of the aerated water through aerated solution inlet 36. If all of the aerated water is to pass through aerated inlet 36, valve 150 is fully closed and valve 154 is open. A level control valve 156 is in series with valve 154 and is controlled by an electrical signal supplied by conductors 152. Thus, if valve 150 is closed and valve 154 is open, the level of aerated water within the lower portion of aeration column 38 is determined by control valve 156.

The system of FIG. 9 shows one means of integrating the components as disclosed herein for practicing the method of removing dispersed oil from an oil in water emulsion within a coalescing media. Further, FIG. 9 shows that a series of options exist for routing aerated water and the emulsion and for commingling the aerated water and emulsion prior to injection into the process vessel or the commingling of the emulsion and aerated water can take place within the vessel, or a combination of these two methods can be employed.

As would be apparent, only a portion of the clean water resulting from the separation of oil from the emulsion is required for use in providing an aerated solution in the process. The portion of the water after being cleaned that is not used for recycling as an aerated solution is conveyed by pipe 158 for discharge to the environment or for other use or disposition.

Figure 10:
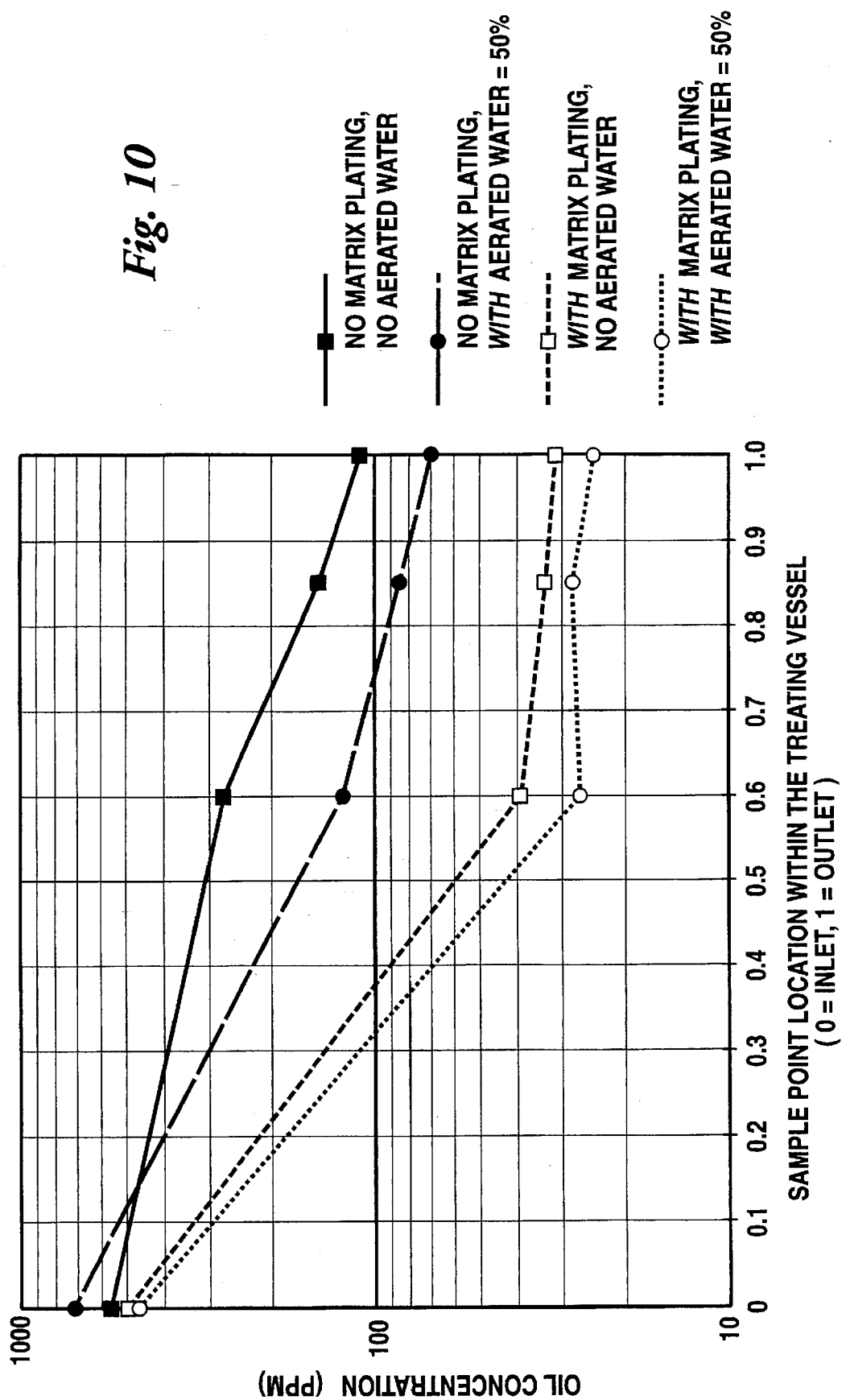
FIG. 10 is a graph that plots oil concentration in an emulsion at four different sample point locations within a process vessel of the type such as shown in FIGS. 1 and 9 for different process condition.

FIG. 10 illustrates the improved results of separation of entrained oil in an emulsion under four different combination of elements as employed in the process vessel. The graph plots oil concentration versus sample point locations within a process vessel such as the type illustrated in FIG. 1. Line 1 shows the results of the system wherein no matrix plates and no aerated water are employed when treating an emulsion having initially 550 parts per million (ppm) of oil. The result is a reduction at the outlet 20 of vessel 10 wherein entrained oil has been reduced from 550 ppm to about 110 ppm, a removal efficiency of 80.7%.

Line 2 shows the use of an aerated solution but without the use of matrix plates. In line 2 the original emulsion contained about 725 ppm and the water discharged at the vessel outlet contained about 70 ppm, a removal efficiency of 90.6%.

Line 3 shows the system with the use of matrix plates but without the use of aerated water wherein an emulsion having an initial 500 ppm resulted in water outlet of approximately 31 ppm, a removal efficiency of 93.8%.

Finally, line 4 shows the system wherein both matrix plates and aerated water are employed and in which the emulsion initially having 500 ppm produced water at the vessel outlet 20 having only 24 ppm, a removal efficiency greater than 95%. The difference in performance between the four cases increases with increasing inlet oil concentration. This chart thus graphically illustrates the improvement achieved in the system by employing aerated water and matrix plates.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A method of removing dispersed oil from an oil in water emulsion comprising the steps of:
   (a) entraining gas in water to form an aerated mixture;
   (b) introducing said emulsion into a treatment vessel having a divider therein extending upwardly from the bottom of the vessel separating the vessel into a first and second compartment, the emulsion passing into the first compartment in which is positioned a first assembly of closely spaced matrix plates formed of oleophilic material, the emulsion passing in contact with said matrix plates;
   (c) introducing said aerated mixture into said treatment vessel to intermingle with said emulsion as the emulsion passes in contact with said matrix plates to cause oil droplets to coalesce on said matrix plates and small gas bubbles from said aerated mixture to adhere to said oil droplets to cause said oil droplets to more readily rise in said emulsion;
   (d) maintaining a liquid level within said vessel, said oil droplets rising to the surface of the liquid;
   (e) extracting oil that accumulates on the surface of the liquid from said vessel; and
   (f) removing water that flows over an upper edge of said divider into said second compartment of the vessel, and through a second assembly of matrix plates, the water being removed from said second compartment and having a substantial portion of the oil removed therefrom.

2. A method of removing dispersed oil from an oil in water emulsion according to claim 1 wherein step (c) is carried out in a manner to create turbulence in said emulsion to cause oil droplets to impinge against each other and with said first matrix plates to promote oil droplet coalescence.

3. The method of removing dispersed oil from an oil in water emulsion according to claim 1 wherein in step (a) the aerated mixture is substantially fully saturated with gas.

4. The method of removing dispersed oil from an oil in water emulsion according to claim 1 wherein steps (b) and (c) are simultaneously carried out within a distribution compartment within said first compartment prior to passing the emulsion and aerated mixture into contact with said first matrix plates.

5. The method of removing dispersed oil from an oil in water emulsion according to claim 1 including the step of separately removing gas from said treatment vessel.

6. The method of removing dispersed oil from an oil in water emulsion according to claim 1 wherein said first assembly of closely spaced matrix plates is formed of a plurality of corrugated sheets of oleophilic material spaced in close proximity to each other.

7. The method of removing dispersed oil from an oil in water emulsion according to claim 6 wherein said sheets of oleophilic material have paralleled corrugations therein that are oriented at an angle relative the vertical.

8. The method of removing dispersed oil from an oil in water emulsion according to claim 7 wherein adjacent sheets of oleophilic material have paralleled corrugations that are oriented in opposed angles relative to the vertical.

9. The method of removing dispersed oil from an oil in water emulsion according to claim 1 wherein the steps (b) and (c) said emulsion and intermingled aerated mixture move essentially in a vertical direction within said treatment vessel first compartment as said emulsion and aerated mixture pass in contact with said first matrix plates.

10. The method of removing dispersed oil from an oil in water emulsion according to claim 1 wherein in steps (b) and (c) said emulsion and intermingled aerated mixture first move essentially in a vertical direction followed by movement essentially in a horizontal direction within said treatment vessel over said divider upper edge as said emulsion and commingled aerated mixture pass in contact with said first matrix plates.

11. A method of removing dispersed oil from an oil in water emulsion according to claim 1 including the step of mixing a coalescing enhancement chemical additive with said emulsion prior to step (b).

12. A system for removing dispersed oil from a water in oil emulsion comprising:
   (1) aeration apparatus for entraining gas in water to provide an aerated mixture;
   (2) a process vessel having having a divider therein extending upwardly from the vessel bottom separating the vessel into a first and second compartment, the emulsion passing through an emulsion inlet into the first compartment;
   (3) a first matrix of closely spaced oleophilic plates positioned within said process vessel first compartment and arranged to receive a flow of emulsion introduced through said emulsion inlet and aerated mixture introduced through an aeration mixture inlet, the oleophilic plates serving to enhance the coalescence of oil droplets from said emulsion, gas bubbles from said aerated mixture adhering to the oil droplets to enhance the buoyancy thereof;
   (4) means of maintaining a water level surface within said process vessel, said oil droplets migrating to the surface of the water level, water having at least a portion of the oil droplets removed therefrom flowing over said divider plate upper edge into said second compartment, the second compartment having a second matrix of closely spaced oleophilic plates therein;
   (5) means of removing oil that accumulates on said water level surface; and
   (6) means of removing water from said second compartment, after the water has passed through said second matrix, the water being at least substantially free of the oil.

13. A system for removing dispersed oil from an oil in water emulsion according to claim 12 including:

means to create turbulence in said emulsion as said gas bubbles are released from an aerated solution to form said aerated mixture to cause oil droplets to impinge upon each other to promote oil droplet coalescence.

14. A system for removing dispersed oil from an oil in water emulsion according to claim 12 including:

a distribution compartment within a lower portion of said process vessel first compartment in communication with said emulsion inlet where the emulsion and aerated mixture are combined prior to contact with said first oleophilic plate matrix.

15. A system for removing dispersed oil from an oil in water emulsion according to claim 12 wherein said process vessel includes a gas outlet, gas bubbles from said aerated mixture within said process vessel being withdrawn through said gas outlet.

16. A system for removing dispersed oil from an oil in water emulsion according to claim 12 wherein said first matrix of closely spaced oleophilic sheets includes at least some corrugated sheets.

17. A system for removing dispersed oil from an oil in water emulsion according to claim 16 wherein said corrugated sheets have paralleled corrugation that are oriented at an angle relative to the vertical.

18. A system for removing dispersed oil from an oil in water emulsion according to claim 16 wherein adjacent sheets of oleophilic material have paralleled corrugations therein that are oriented in opposed angles relative to the vertical.

19. A system for removing dispersed oil from an oil in water emulsion according to claim 12 wherein said process vessel includes an aerated mixture inlet and wherein said emulsion and said aerated mixture are commingled, at least in part, within said vessel prior to passage through said first matrix of closely spaced oleophilic plates.

* * * * *